United States Patent [19]
De Bernardi et al.

[11] Patent Number: 5,632,075
[45] Date of Patent: May 27, 1997

[54] TOOL-CARRIER TURRET

[75] Inventors: Franco De Bernardi; Loris Andreoli, both of Varese, Italy

[73] Assignee: Duplomatic S.r.L., Varese, Italy

[21] Appl. No.: 401,383

[22] Filed: Mar. 9, 1995

[51] Int. Cl.[6] .............................. B23B 29/32; B23B 39/20
[52] U.S. Cl. .............................................. 29/40; 29/48.5 A
[58] Field of Search ................................ 29/276, 48.5 R, 29/48.5 A, 40; 408/35; 82/121, 131

[56] References Cited

U.S. PATENT DOCUMENTS 5,168,614  12/1992  Thumm ........................................ 29/40
5,178,040  1/1993  Schmidt .

FOREIGN PATENT DOCUMENTS 214090  7/1986  European Pat. Off. .
3929136  1/1989  Germany .

*Primary Examiner*—M. Rachuba
*Assistant Examiner*—Kenneth J. Hansen
*Attorney, Agent, or Firm*—Rosen, Dainow & Jacobs, L.L.P.

[57] ABSTRACT

A tool-carrier turret having a high displacement speed, particularly for lathes and work centres the rotatable table of which is provided with a plurality of supports for fixed tools and a plurality of supports for tools of the rotating type. The turret is provided with a single motor for driving the rotating tools and for displacement of the table through respective mechanical transmissions, as well as a device for commuting the drive from the electric motor to one or other of the mechanical transmissions in synchronism with the device for locking and releasing the table. An encoder is connected to the drive shaft of the rotatable table via a mechanical coupling which makes it possible to obtain a complete rotation of the encoder shaft for each angular displacement of the table between two successive tools.

7 Claims, 3 Drawing Sheets

TOOL-CARRIER TURRET

TECHNICAL FIELD

The present invention relates to a rapidly displaceable tool-carrier turret, particularly for lathes and work centres performing operations of turning, piercing, milling and the like comprising a base body, a tool-carrier table supported by the base body and rotatable with respect thereto, means for locking and releasing the said table with respect to the said base body, a plurality of supports for fixed tools and a plurality of supports for rotating tools positioned on the said rotatable table and distributed around its periphery, the said supports for rotating tools including respective shafts for rotation of the tool, a motor, a first mechanical transmission between the said motor and the said rotatable table to carry a preselected tool support into a working position, a second mechanical transmission between the said motor and the shaft of a rotating tool when located in the said working position, the said second mechanical transmission including means for engaging the said tool shaft, means for commuting the said motor alternatively between the first and second mechanical transmission and vice versa in synchronism with the said table locking and release means and means for electronically detecting the position assumed by the rotatable table.

BACKGROUND OF THE INVENTION

Turrets of the above-indicated type are known in the art and several versions are illustrated, for example in German patent DE 39 29 136, and in European Patent No. 214 090.

However their mechanisms are not well adapted to the achievement of high speed of displacement of the tools because the means for locking and releasing the rotatable table with respect to the base body provide for an axial movement of the table which is lifted with respect to the base body requiring an appreciable time as a consequence of the significant mass to be displaced.

OBJECTS OF THE INVENTION

The object of the present invention is that of providing a turret with mechanical transmission substantially free from dead times in such a way as to be able to achieve extremely short tool positioning times and extremely short times of the order of 0.2–0.3 seconds, for getting a tool of the rotating type into operation.

This object is achieved by a turret of the above-specified type wherein said means for commuting the motor between the first and second mechanical transmission and vice versa include a cylindrical tubular element with one end in engagement with the drive shaft by means of a splined coupling which allows an axial displacement, first and second sets of teeth concentric to the said tubular element and spaced axially from one another, an hydraulic cylinder, a piston slidable axially in the cylinder and forming a first and a second hydraulic chamber, a piston rod with one end connected to the said piston with freedom to rotate and the other end connected to the said tubular element to displace this latter axially between a position in which the said first teeth are in mesh with the first said mechanical transmission and another position in which the said second teeth are in mesh with the said second mechanical transmission, the actuation of the said piston taking place in synchronism with the said means for locking and releasing the table with respect to the base.

BRIEF DESCRIPTION OF THE DRAWINGS

Further characteristics of the invention will become apparent from the detailed description of a practical embodiment of the turret which is described hereinafter with reference to the attached drawings in which.

DETAILED DESCRIPTION OF THE INVENTION

Figure 1:
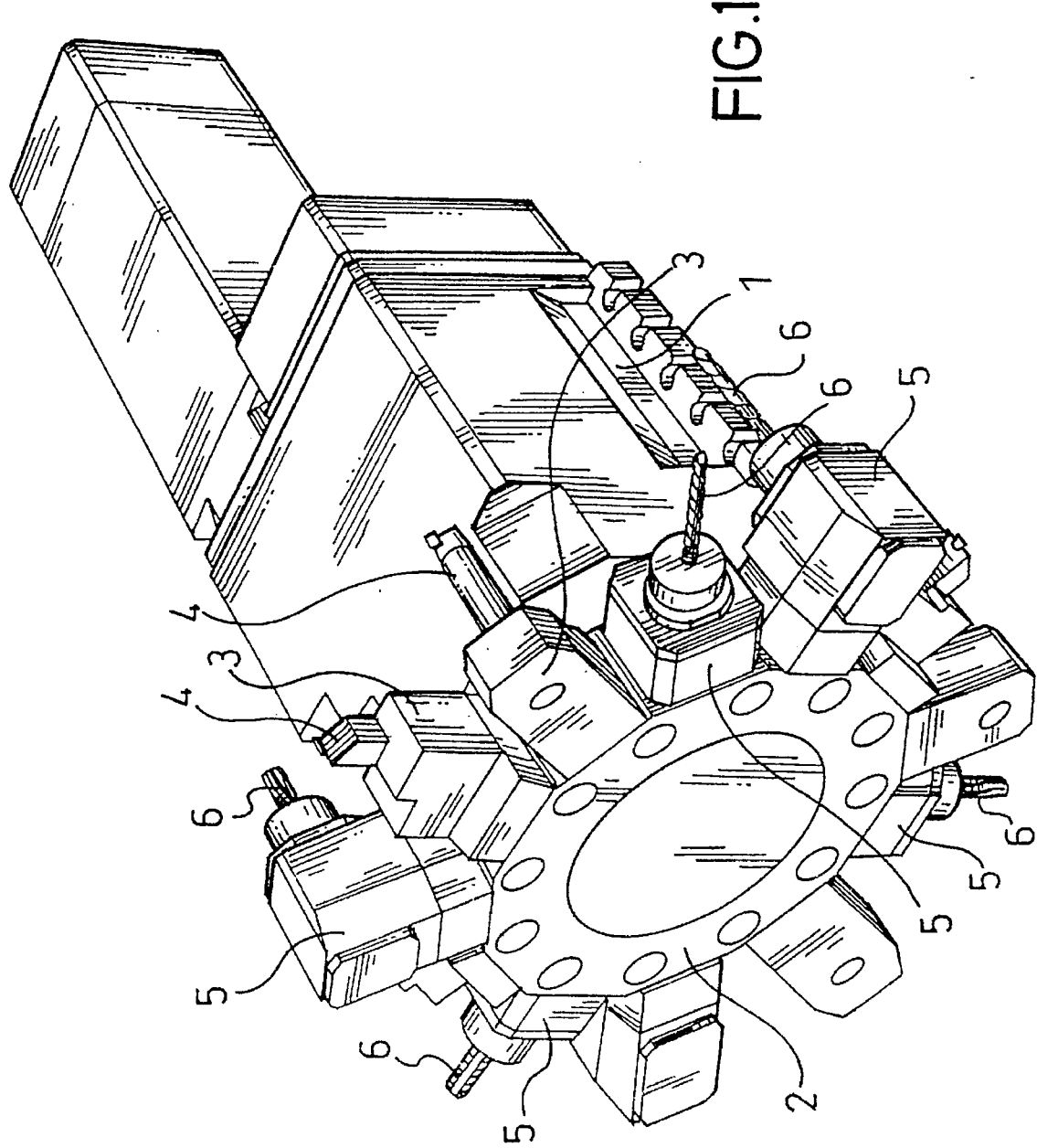
FIG. 1 shows a perspective view of the turret.
Figure 2:
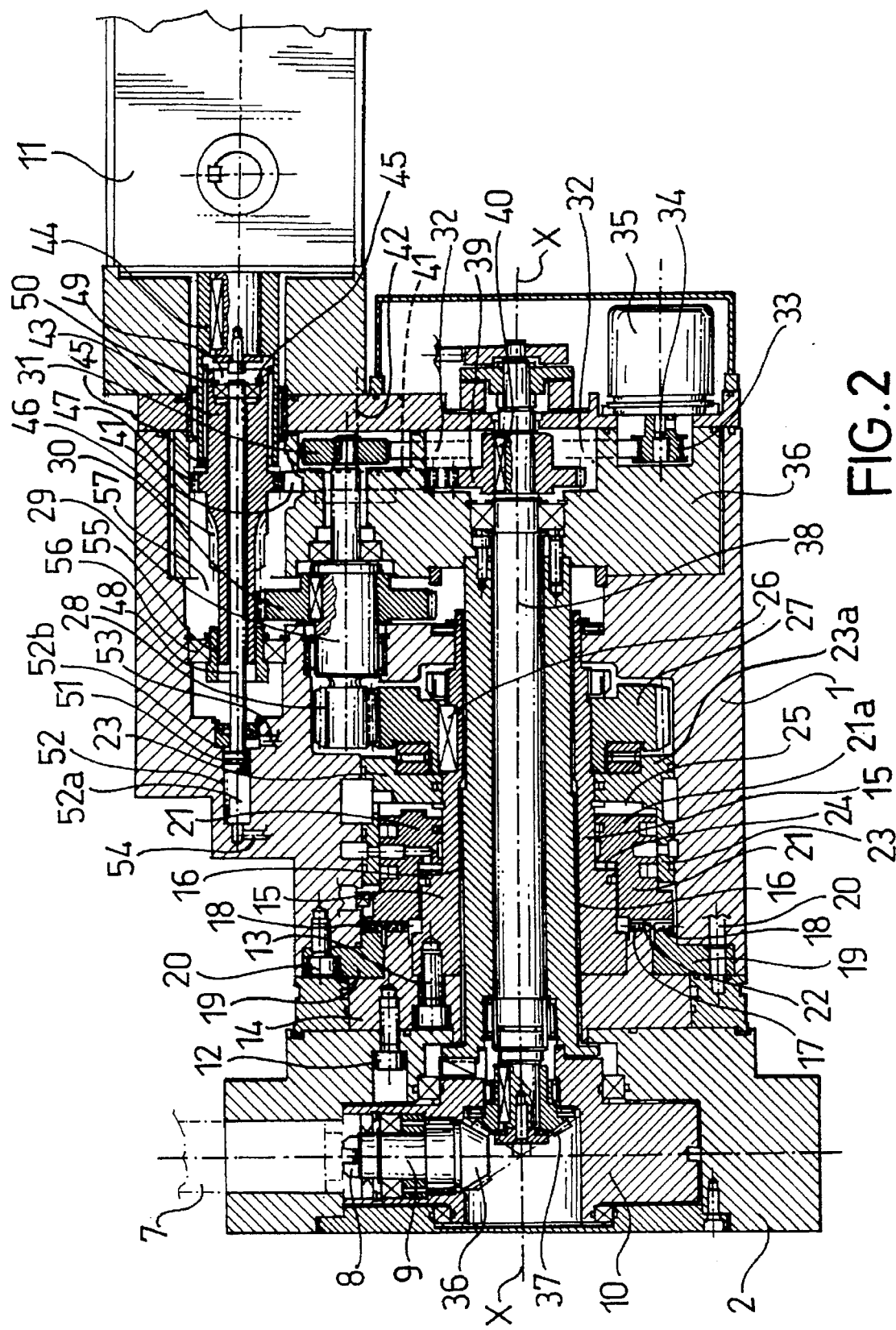
FIG. 2 shows a schematic view in transverse section of the turret, illustrating the mechanical transmissions thereof.

With reference to the FIGS. 1 and 2, the reference numeral 1 indicates the base body of the turret while the reference numeral 2 indicates the rotatable table on which are mounted a support 3 for fixed tools 4 and supports 5 for rotating tools 6.

The supports 5 include a shaft 7 (FIG. 2) for putting the corresponding tool 6 into rotation. When the associated support 5 is in the working position of the turret, the shaft is driven via a clutch 8 positioned on the end of a driven shaft 9 mounted in a housing 10 fixed to the base body 1 of the turret and which constitutes the working position of the rotating tools.

The device for carrying the various rotating tools into the working position and for engaging their shafts 7 with the driven shaft 9 may be, for example, of the type illustrated in European Patent Application No. 331 003 to which reference can be made for further details.

The rotation of the table 2 in order to change the tool in the working position, and that of the driven shaft 9 for the rotating tools, is driven by a single motor 11, which in the specific example is represented by an electric servomotor, known per se, via respective first and second mechanical transmissions and commutation means which will be described hereinbelow.

The rotatable table 2 of the turret is fixed by means of screws 12 and 13 and the intermediate disc 14 to a tubular sleeve 15 having an axial cavity 16.

The intermediate disc 14 is provided with a gear ring 17 which is positioned in the same plane as a gear ring 18 carried by a disc 19 concentric with the disc 14 and securely fixed to the base body 1 of the turret by means of screws 20.

Coaxially of the sleeve 15 is mounted an annular body 21 which is provided with teeth 22 positioned facing the gear rings 17 and 18.

The annular body 21 is displaceable axially of the sleeve 15 between a position in which its teeth 22 are in mesh with both the gears 17 and 18 and a retracted position in which the teeth 22 are disengaged from the others.

In one of the two said positions the rotatable table 2 is locked to the base body 1 and therefore finds itself in a working position of the tools, and in the other it is rendered free to allow its displacement and therefore change of a tool.

The displacement of the annular body 21 is achieved by means of a hydraulic cylinder structure of which the annular body 21 with the part 21a constitutes the piston.

To this end the annular body 21 is lodged within a jacket 23 coaxially of the sleeve 15. Said jacket 23 is in one piece with the reaction wall 23a and forms, at the sides of piston 21, two pressure chambers 24 and 25, naturally with the interposition of necessary sealing members not described because they are conventional, and supply ducts and discharges for the pressure fluid.

Figure 3:
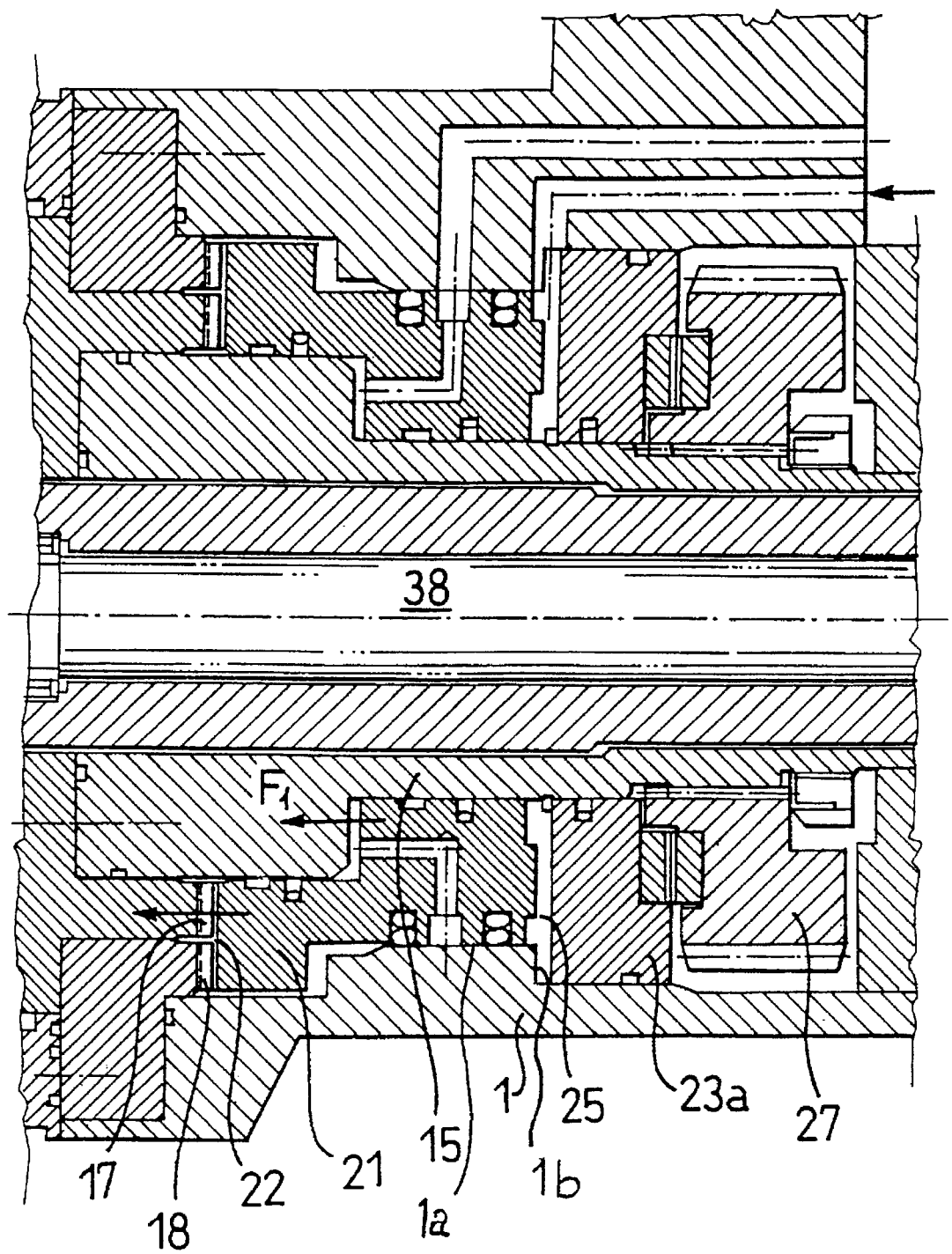
FIG. 3 shows in cross section a modified embodiment of the means for locking and releasing the tool carrier table with respect to the base body.

With reference to the modified embodiment of FIG. 3, the annular body 21 is directly in contact with the inner wall 1a of the tubular base body 1 without interposition of the jacket portion 23 which, in the shown embodiment, reduces itself only to the reaction wall 23a whose cross section results greater than that of FIGS. 1 and 2.

The embodiment of FIG. 3, as it could be appreciated, by means of the shoulder 1b provided in the base body 1, gives rise to an increase of the thrust on the reaction wall 23a so that to withstanding the opposed thrust which would cause the disengagement of the teeth 22 from the teeth 17 and 18 during the so called "reverse side processing".

Finally, the gearwheel 27 is fixed, by means of the key 26, to the sleeve 15 and meshes with pinion 28 fitted to the shaft 29 which, in turn, carries the gear wheels 30 and 31.

This latter gear wheel 31, via a toothed transmission belt 32 in order to avoid slippage, is connected with a pinion 33 fitted to the shaft 34 of an electronic positioning device 35, particularly constituted by an encoder, possibly also of incremental type, supported by the wall 36 of the turret.

The gear wheels mentioned above constitute the first mechanical transmission which, as will be seen better hereinafter, is intended to move the rotatable table 2 for positioning the tools into the working position by the application of drive to the gear wheel 30.

As can be seen, the encoder 35 is fitted within the assembly of gear wheels through the transmission belt 32 with the result that it can detect exclusively the speed of rotation of this assembly and therefore the position reached by the rotatable table 2.

In particular, the transmission ratio between the gear wheel 31 and the pinion 33 can be established in such a way that, each displacement of one step between two successive tool positions corresponds to a complete rotation of the shaft 34.

In this way the reference notch of the encoder 35 always corresponds to a positioning of the tool thereby reducing the time for analysis and detection of the position reached.

The second mechanical transmission, that is to say that intended to drive the rotating tools 6 and in particular to transmit drive to the shaft 9 of the working station, comprises a pair of bevel gears 36, 37, a shaft 38 fitted coaxially of the sleeve 15, within the cavity 16 of this, a gear wheel 39, fixed by a key 40, and a gear wheel 41 fitted on a shaft shown only in outline 42 on the section shown in FIG. 2.

The commutation means for alternatively transmitting drive to the rotatable table 2 of the turret about the axis X—X or to the rotary shaft 9 of a rotating tool comprises a tubular element 43 connected to the drive shaft 44 of the servo motor 11 via a splined coupling 45 between said shaft 44 and said tubular element 43 which allows the transmission of rotary movement and axial displacement at the same time.

This tubular element 43 is provided with a first set of gear teeth 46 and a second set of gear teeth 47 concentric with its longitudinal axis. The second set of gear teeth 47 in the position illustrated in FIG. 2, is located in engagement with the gear 41 and, via this, with the second mechanical transmission intended to drive a rotating tool.

The first set of gear teeth 46 is on the other hand intended to mesh with the gear 30 upon axial displacement of the tubular element 43 in a manner which will be described hereinbelow.

The tubular element 43 is positioned coaxially on the shaft 48 with respect to which it is rotatable. This shaft 48 is in fact connected to one end of the tubular element 43 via the disc 49 with the interposition of the bearing 50.

The opposite end of the shaft 48 is on the other hand connected to the piston 51 housed in the cylinder 52 forming pressure chambers 52a and 52b.

Ducts 53 and 54 lead to this latter cylinder, which ducts open into opposite sides of the piston 41.

The tubular element 43 is finally supported, via the bushing 55 and the bearing 56, within the housing 57 of the body of the turret.

The ducts 53 and 54 intended to carry the pressure fluid into the cylinder 52 are connected in parallel with the chambers 24 and 25 of the annular body 21 for locking and releasing the table 2 in the sense that, when pressure is present in the chamber 23 and the table 2 is locked, as illustrated in FIG. 2, pressure acts simultaneously on the piston 51 in the cylinder 52 to maintain tubular sleeve 43 displaced towards the right in the position illustrated in FIG. 2 with the set of gear teeth 47 in mesh with the gear wheel 41 therefore engaging the second mechanical transmission intended to drive the rotation of the tools 6.

If, on the other hand, pressure is introduced into the chamber 24 and the table is released, the pressure is simultaneously also transmitted to the chamber 52b through the duct 53, and the tubular sleeve 43 is displaced towards the left, as viewed in FIG. 2, carrying the set of teeth 46 into engagement with the gear wheel 30 and simultaneously disengaging the gear wheels 47 and 41. In this position the first mechanical transmission is active for the angular displacement of the table 2 with simultaneous actuation of the encoder 35 for position detection.

In the example turret described above it can be appreciated that the operating times of the devices are reduced to the minimum; in fact, while displacement of the annular element 21, 21a is taking place to release the table 2 of the gear teeth 47 are being simultaneously positioned in mesh with the gear 30 to effect change of position of the table 2, the current position of which is known by the encoder 35.

This latter, moreover, by virtue of the particular transmission ratio adopted between its shaft and that for rotation of the table, does not necessitate preliminary reading of its zero point.

What is claimed is:

1. In a high speed displaceable tool-carrier turret apparatus, a base body, a toolcarrier table supported by the base body and rotatable with respect thereto and non-axially displaceable with respect to said base body, locking means for locking and releasing the said table from rotation with respect to the said base body, a plurality of supports for rotating tools positioned on said table, each of said supports for rotary tools including a respective tool drive shaft for rotation of a tool;

a motor, a first mechanical transmission for coupling said motor and said table to bring a preselected tool support and associated tool into a working position, and a second mechanical transmission for coupling said motor and one of said tool drive shafts when a rotary tool is located in one of said working positions, the improvement of means for commuting the said motor alternately between said first and second mechanical transmissions, in synchronism with the said rotatable table locking and releasing means, comprising: a cylindrical tubular element having one end formed as a splined coupling with said motor providing transmission of rotary motion and axial displacement to said cylindrical tubular element, axially spaced apart first and second sets of gear teeth on and concentric with said tubular element, hydraulic means comprising an hydraulic cylinder and a piston axially slidable in said cylinder forming first and second hydraulic chambers;

a piston rod, one end of which is connected to the said piston with freedom of rotation and the other end connected to the said tubular element to displace said tubular element axially between a first position in which the said first set of teeth is coupled with the said first mechanical transmission and a second position in which said second set of teeth is coupled with said second mechanical transmission, said hydraulic means effectuating release of said means for locking said table in synchronism with coupling said motor with said first transmission and effectuating engagement of said locking means in synchronism with coupling said motor with said second transmission.

2. A turret according to claim 1, wherein said means for locking and release of the rotatable table with respect to the base body comprise an annular element positioned coaxially of the shaft of rotation of the said table and within a jacket forming two pressure chambers provided with respective supply and discharge ducts for fluid under pressure.

3. A turret according to claim 1 wherein said motor is a servo motor.

4. A turret according to claim 1 wherein said means for electronically detecting the position assumed by the rotatable table comprise an encoder the rotary shaft of which is mechanically connected to the rotary shaft of the said table with the interposition of a mechanical transmission.

5. A turret according to claim 4, wherein said mechanical transmission interposed between the said encoder and the rotary shaft of the said rotatable table is provided with a transmission ratio such that each displacement between two successive tool positions of the rotatable table corresponds to a complete rotation of the shaft of the encoder.

6. In a high speed displaceable tool-carrier turret apparatus, a base body, a toolcarrier table supported by the base body and rotatable with respect thereto and being non-axially displaceable with respect to the base body, means for locking and releasing the said table from rotation with respect to the said base body, a plurality of supports for rotating tools positioned on said table; each of said supports for rotary tools including a respective tool drive shaft for rotation of a tool;

a motor, a first mechanical transmission for coupling said motor and said rotatable table to bring a preselected tool support and associated tool into a working position, a second mechanical transmission for coupling said motor and said tool drive shaft when a rotary tool is located in one of said working positions, and means for electronically detecting the positions assumed by the rotatable table, the improvement of means for commuting the said motor alternately between said first and second mechanical transmissions, in synchronism with the said rotatable table locking and releasing means, comprising a cylindrical tubular element having one end formed as a splined coupling with said motor providing transmission of rotary motion and axial displacement to said cylindrical tubular element, axially spaced apart first and second sets of gear teeth on and concentric with said tubular element, hydraulic means comprising an hydraulic cylinder and a piston axially slidable in said cylinder forming first and second hydraulic chambers;

a piston rod, one end of which is connected to the said piston with freedom of rotation and the other end connected to the said tubular element to displace said tubular element axially between a first position in which the said first set of teeth is coupled with the said first mechanical transmission and a second position in which said second set of teeth is coupled with said second mechanical transmission; said hydraulic means effectuating release of said means for locking said table in synchronism with coupling said motor with said first transmission and effectuating engagement of said locking means in synchronism with coupling said motor with said second transmission.

7. A high speed rotatable tool-carrier turret apparatus including;

a base body, a tool-carrier table rotatable with respect to said base body, said tool-carrier table being rotatable about an axis of rotation and being non-axially displaceable with respect to base body, locking means for releasably locking said tool-carrier table from rotation with respect to said base body a plurality of supports for rotating tools situated on said rotatable table, each of said supports including a tool drive shaft for rotation of a tool, a motor, a first mechanical transmission for coupling said motor to rotate said table to bring a preselected tool support into a working position, a second mechanical transmission for coupling said motor to one of said tool drive shafts for rotating a tool in a tool support in a working position, and means for coupling said motor alternatively between said first and second transmissions, in synchronism with said means for releasably locking said table from rotation, wherein said means for commuting said motor between said first and second transmission means comprises:

an axially displaceable drive shaft having at one end a splined coupling with said motor for transmission of rotary motion to said drive shaft, axially spaced apart first and second sets of gear teeth on and concentric with said drive shaft, and hydraulic means coupled to said drive shaft for moving said drive shaft axially to alternately couple said first and second sets of gear teeth with said first and second transmissions, respectively, said hydraulic means effectuating release of said locking means when said first transmission is coupled to said motor, and effectuating engagement of said locking means when said second transmissions is coupled to said motor.

\* \* \* \* \*